United States Patent

Dooris et al.

[11] Patent Number: 5,887,334
[45] Date of Patent: Mar. 30, 1999

[54] METHOD FOR SPLICING A LINEAR STEPPER MOTOR PLATEN

[75] Inventors: James F. Dooris, Cary; Douglas M. Cary, Chapel Hill; Bobby Gene Pilkington, Smithfield, all of N.C.

[73] Assignee: MTS Systems Corp., Eden Prairie, Minn.

[21] Appl. No.: 925,567

[22] Filed: Sep. 8, 1997

[51] Int. Cl.$^6$ .................................................. H02K 15/04
[52] U.S. Cl. ................ 29/596; 29/607; 29/609; 310/12
[58] Field of Search ............................ 29/596, 607, 609; 310/12, 13

[56] References Cited

U.S. PATENT DOCUMENTS 4,310,966  1/1982  Breitenbach ............................... 29/596
4,897,916  2/1990  Blackburn .................................. 29/609

*Primary Examiner*—Carl E. Hall
*Attorney, Agent, or Firm*—Mills Law Firm PLLC; Clifford F. Rey

[57] ABSTRACT

A method of splicing the platen component of a linear stepper motor to extent its range of travel for various applications is disclosed. In a linear stepper motor the so-called forcer or armature component moves linearly along the platen or stator in the manner of a track assuming discrete locations in response to the state of the electrical current in the field windings of the forcer. Conventional machining equipment limits the maximum length of the platen that can be produced for such a motor. Because various industrial applications demand an extended length of the platen component, the splicing method enables two or more platen components to be arranged in an end-to-end relation while maintaining positional accuracy, preventing air loss from the air bearings typically utilized with such a motor, and maintaining the magnetic flux path necessary for proper operation of the forcer component of the motor. The splicing method utilizes conventional machining operations to provide an angular cut on the respective end portions of the two platens to be joined. Thereafter, a plurality of parallel teeth formed in the platen are axially aligned by the use of optical devices to ensure the continuity of the magnetic flux path which extends through the teeth of the platen during the operation of the motor.

6 Claims, 3 Drawing Sheets

METHOD FOR SPLICING A LINEAR STEPPER MOTOR PLATEN

BACKGROUND OF INVENTION

1. Field of Invention

This invention relates generally to linear stepper motors and, more particularly, to a method of splicing the platen component of a linear stepper motor to increase its range of travel.

The linear stepper motor is well known in the prior art and operates upon established principles of magnetic theory. The stator or platen component of the linear stepper motor consists of an elongated, rectangular steel bar having a plurality of parallel teeth that extends over the distance to be traversed and functions in the manner of a track for the so-called forcer component of the motor.

The platen is entirely passive during operation of the motor and all magnets and electromagnets are incorporated into the forcer or armature component. The forcer moves bi-directionally along the platen assuming discrete locations in response to the state of the electrical current in its field windings.

Such a linear stepper motor can be utilized to perform various functions and is particularly well adapted for use as a precision linear measuring device over extended distances.

A problem arises in that the platens are manufactured in fixed lengths and because of the size limitations of the manufacturing equipment, the maximum size that can be produced by conventional methods is 144 inches. However, in many industrial applications it would be desirable to have a precision linear measurement device based on a linear motor which would perform accurately up to 300 inches or more.

Thus, the present invention has been developed to provide a method of splicing platen components together to extend their length while maintaining the positional accuracy of the motor and the integrity of the magnetic flux field necessary for proper operation of the forcer component of the motor.

2. Description of Related Prior Art

A printed publication entitled, *LX Indexer/Drive User Guide* prepared by the Compumotor Division, Parker Hannifin Corporation discloses the theory of operation for a linear stepping motor.

SUMMARY OF THE INVENTION

After much research and study of the above mentioned problem, the present invention has been developed to provide a method of splicing individual platens together to form a continuous platen component of any desired length while ensuring the positional accuracy of the linear motor and preventing the distortion of the magnetic flux paths created within the platen necessary for proper operation of the forcer or armature of the linear motor.

The magnetic flux path or lines of magnetic force that pass between the forcer and the platen components of a linear stepper motor create a strong normal force of attraction. This attractive force must be offset with some bearing arrangement to maintain a precise clearance between the magnetic pole faces of the forcer and the platen teeth during operation.

If two conventional platens are joined in an end-to-end relationship, an air gap occurs where the platen ends meet. This air gap will cause an interruption in the magnetic flux path and the forcer component will not operate across the juncture between the two platens.

In view of the above, it is an object of the present invention to provide a method of splicing the individual platens together to virtually eliminate the disruption of the magnetic flux field across the juncture between the platens during operation of the motor.

Another object of the present invention is to provide a method of splicing the platen components together while maintaining the positional accuracy of the forcer component ensuring consistent operation of the linear stepper motor.

Another object of the present invention is to provide a method of splicing platen components together which will prevent excessive air loss between the forcer and platen components when a so-called air bearing is utilized to maintain the distance therebetween during operation of the linear motor.

Another object of the present invention is to provide a method of splicing platen components together which will permit the linear stepper motor to provide precision linear measurement up to a dimension of 300 inches or more.

Other objects and advantages of the present invention including manufacturability will become apparent and obvious from a study of the following description and the accompanying drawings which are merely illustrative of such invention.

DETAILED DESCRIPTION OF THE PREFERRED EMBODIMENT

Prior to describing the platen splicing method of the present invention for extending the range of travel of a linear stepper motor, it may be beneficial to briefly review the structure and function of the linear motor itself.

Figure 1:
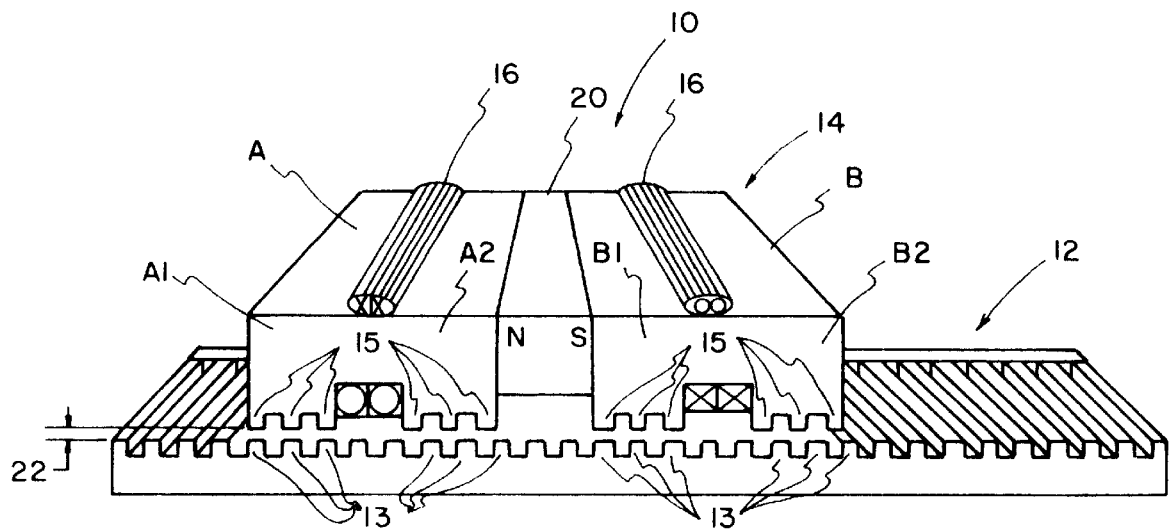
FIG. 1 is a perspective view of a linear stepper motor showing the details of the construction thereof.

With reference to the drawings, there is shown therein the basic structure of a linear stepper motor illustrated in FIG. 1 and indicated generally at 10.

The linear stepper motor 10 operates on the principle that a piece of ferromagnetic steel will align itself with a magnetic field imposed upon it. The linear stepper motor 10 is a relatively simple structure having a stator or platen, indicated generally at 12, that extends linearly over the distance to be traversed by the so-called forcer or armature, indicated generally at 14.

During operation of the motor 10 the platen 12 is entirely passive with the forcer 14 moving in either direction along the platen 12 assuming discrete positions in response to the state of the electrical current in its field windings 16.

The forcer 14 includes two electromagnets A and B and a strong, rare-earth permanent magnet 20 which is interposed therebetween. Such a motor is often referred to as a linear hybrid stepper motor since it is comprised of both permanent and electromagnets.

It will be noted that each of the two electromagnets A and B include two pole faces A1, A2, B1, and B2 respectively.

Each of the pole faces A1, A2, B1 and B2 include a plurality of forcer teeth 15 which function to concentrate the magnetic flux or lines of magnetic force during operation as set forth hereinafter in further detail.

It will be appreciated by those skilled in the art that each of the four sets of forcer teeth 15 disposed on the pole faces A1, A2, B1 and B2 are arranged in mechanical quadrature such that only one set of forcer teeth 15 at a time can be aligned with the horizontally opposed platen teeth 13.

Referring now to FIGS. 2A–2D, there are shown therein schematic representations of the geometry of the linear stepper motor 10 showing the forcer 14 in four distinct stages or steps of excitation.

When current is established in a field winding 16, the resulting magnetic field reinforces the permanent magnetic flux generated by the permanent magnet 20 at one pole face and cancels it at the other face. Conversely, by reversing the flow of current, the reinforcement and cancellation of the magnetic field are exchanged.

When the electrical current is removed from the field winding 16, the permanent magnetic flux generated by a permanent magnet 20 divides equally between the respective pole faces. Thus, by selectively applying electrical current to electromagnets A and B, it is possible to concentrate the magnetic flux at any of the respective pole faces A1, A2, B1 and B2 of the forcer 14 as depicted in FIGS. 2A–2D. Accordingly, the pole faces A1, A2, B1, or B2 receiving the highest magnetic flux concentration will attempt to align its respective teeth 15 with the platen teeth 13.

Figure 2A:
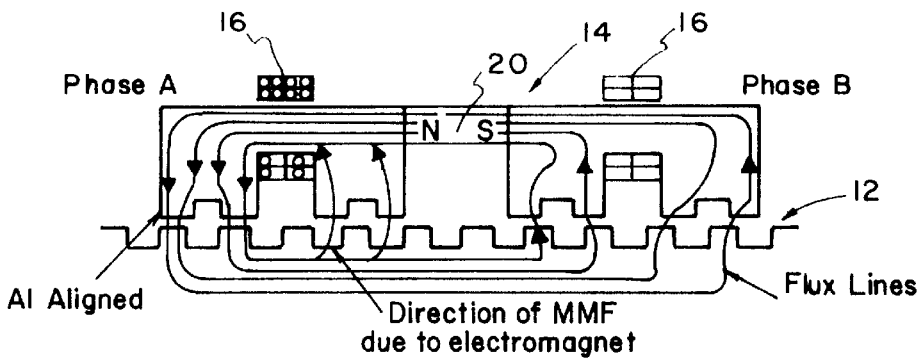
FIGS. 2A–2D are a series of schematic representations of the linear stepper motor in operation showing the forcer component in four distinct stages of excitation.
Figure 2B:
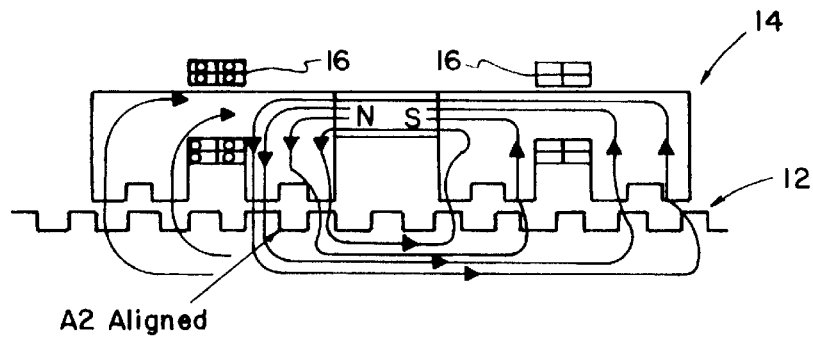
Figure 2C:
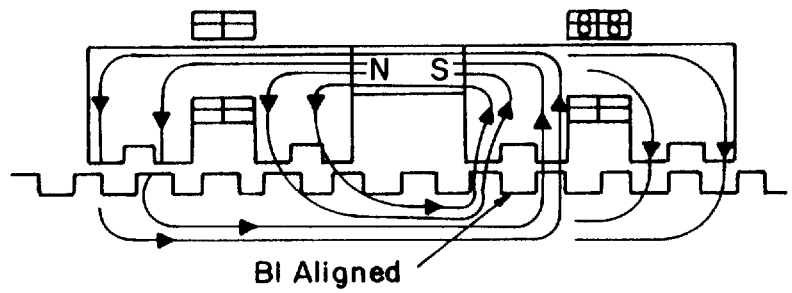
Figure 2D:
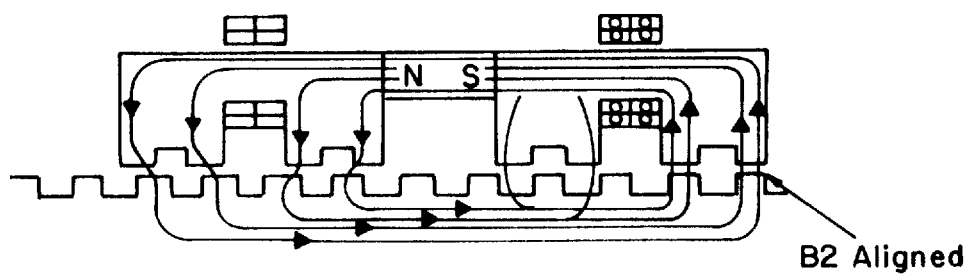

The four stages or steps depicted in FIGS. 2A–2B result in the movement of one tooth interval to the right as viewed in the drawings. If the electrical current is reversed the steps are reversed in order and the forcer 14 will move to the left as viewed in the drawings.

If the sequence depicted in FIGS. 2A–2D is repeated, the forcer 14 continues its movement along the platen 12. When the flow of electrical current is discontinued, the forcer 14 stops with the appropriate tooth set aligned. At rest, the forcer 14 develops a restoring or holding force that opposes any attempt to displace it from its equilibrium in the stopped position.

The magnetic flux or lines of magnetic force as shown in FIGS. 2A–2D that pass between the forcer 14 and the platen 12 create a very strong normal force of attraction between the two components. This attractive force must be offset with some bearing arrangement to maintain precise clearance between the forcer teeth 15 and the platen teeth 13. Thus, linear stepper motors as depicted herein utilize either mechanical roller bearings (not shown) or air bearings (not shown) to maintain a clearance gap between the lower surface of the forcer 14 and the upper surface of the platen 12 as at 22 and shown in FIG. 1.

Since such roller bearings and air bearings are well known to those skilled in the art, further detailed discussion of the same is not deemed necessary.

In conventional practice platens are manufactured in fixed lengths and because of the size limitations of the manufacturing equipment involved, the maximum length that can presently be produced is 144 inches. In many industrial applications it would be desirable to obtain platens 12 of a significantly longer dimension in the range of up to 300 inches.

For example, the linear stepper motor 10 could be utilized as a precision linear measuring device for inspecting dimensions in excess of 300 inches if such platens were available.

In addition, due to the high cost of manufacturing such platens it would desirable to reassemble them in various configurations without scraping existing platens and starting over.

Thus, the present method of splicing platens together has been developed to solve this problem and will now be described.

Figure 3:
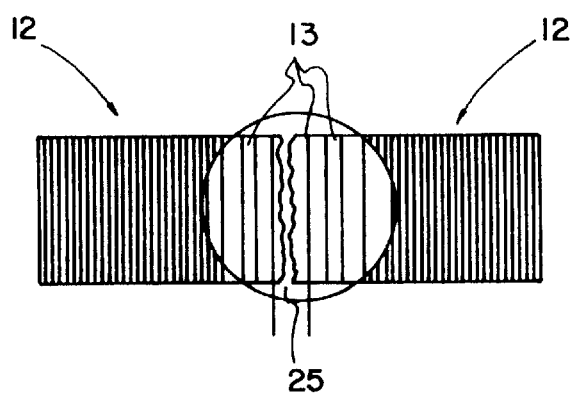
FIG. 3 is a partially magnified plan view of two platens joined in end-to-end relation by a so-called butt splice.

In joining two platens 12 together in end-to-end relation a problem is encountered as seen in FIG. 3. An air gap as at 25 inevitably occurs where the ends of the respective platens 12 are joined together. Such an air gap as at 25 will cause the magnetic flux to leak out of the teeth 13 of the platen and short circuit that to the magnetic pole of the forcer.

If the juncture between the ends of the respective platens is a so-called butt joint as shown in FIG. 3, then the air gap 25 extends along the entire width of the platen 12 causing 100% of the magnetic flux to short circuit and causing the forcer 14 to stall when traveling across the butt joint.

Figure 4:
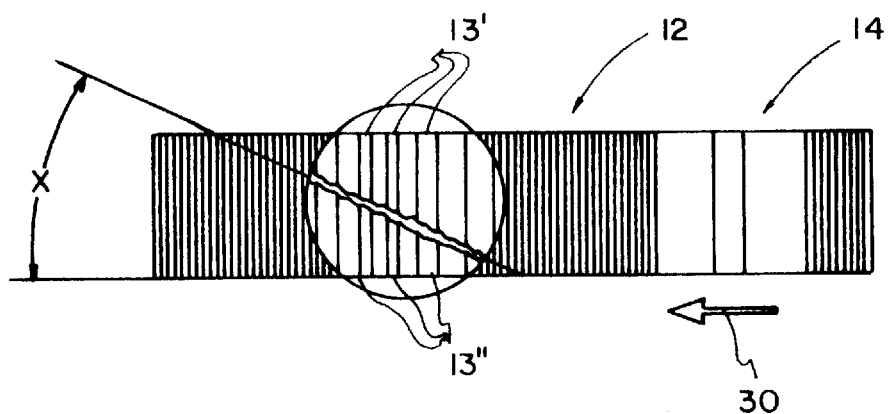
FIG. 4 is a partially magnified plan view of two platens joined by the angular splicing method of the present invention.

In contrast the angular splice depicted in FIG. 4 which is utilized in the method of the present invention causes a relatively small portion of the teeth to be gapped thereby reducing the short circuit to about 1.15% of the total magnetic flux path and all but eliminating the effects of the short circuit experienced with the butt joint shown in FIG. 3.

In the practice of the angular splicing method of the present invention, the respective end portions of the two platens are cut at an angle using conventional machine processes such as milling and surface grinding to a close tolerance in the range of 0.001 inches flatness.

In the preferred embodiment the angle X of the splice is between 25° and 45° with an angle X of 33° producing the optimal result for mechanical mounting requirements because such a configuration would leave at least one mounting hole (not shown) at the end of each platen 12 for securing the assembled platens 12 to a base or table.

When the two angular ends of the platens 12 are brought together for joining, the teeth 13 thereof are positioned in axial alignment in spliced tooth pairs designated 13' and 13" as shown in FIG. 4. The angular splice provides optimal conditions for the magnetic flux path since only a small portion of the magnetic flux path in any such spliced tooth pair is affected.

The primary mechanical advantage of the angular splicing method is in being able to maintain the accuracy of the tooth spacing across the splice joint.

Due to the tolerances that can be maintained in conventional machining operations, the butt slice illustrated in FIG. 3 will never be precisely flat allowing the width of the gap to be as much as 0.002 inches.

This machining tolerance would add to or subtract from the total distance between the teeth 13 adjacent to the butt joint producing a positional error as the forcer 14 travels over the joint.

However, the same machining tolerances in the angular splice of the present invention do not add or subtract from the distance between the spliced tooth pairs 13' and 13". Any variation in the splice joint will change the width of the gap between the spliced tooth pairs but will not affect the dimensions between adjacent teeth 13 along the gap.

In practical use the platens 12 with the angular splice machined thereon are secured to a base or table (not shown) and fixedly attached thereto by machine screws. The spliced tooth pairs 13' and 13" are aligned by use of an optical comparator or other optical magnification device suitable for this purpose.

Since optical comparators are well known to those skilled in the art, further detailed discussion of the same is not deemed necessary.

The accuracy of the tooth alignment in the two spliced platens 12 is confirmed by the ability of the forcer 14 to traverse the angular splice. Testing has indicated that there is a transition in the concentration of the magnetic flux as it flows across the angular splice.

Initially, all of the magnetic flux flows through the teeth 13 along the splice adjacent the forcer 14 as it approaches the splice as shown by directional arrow 30. However, as the forcer 14 steps from tooth pair to tooth pair 13' and 13" along the splice, the magnetic flux path is gradually reduced in the platen adjacent the forcer 14 and gradually increased in the platen across the splice from the forcer 14.

Accordingly, when the forcer 14 reaches the center of the splice, the magnetic flux path has been divided equally between the two platens. This gradual transition continues until 100% of the magnetic flux is flowing through the tooth of the platen across the splice.

From the above it can be seen that the splicing method of the present invention provides a practical and cost effective way of extending the length of the platen component of a linear stepper motor for various industrial applications.

Using the method of the present invention the platen may be extended in length while maintaining positional accuracy, preventing air loss from the air bearings associated with such a device, and maintaining the integrity of the flux paths required for proper operation of the forcer component of a linear stepper motor.

The terms "upper", "lower", "right", "left", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

We claim:

1. A method of splicing platen components of a linear stepper motor, said platen components comprising an elongated ferromagnetic steel bar having a longitudinal axis and including a plurality of generally parallel teeth formed therein in perpendicular relation to said axis, said motor including an electromagnetic forcer component having a plurality of electromagnets enabling said forcer component to move bi-directionally along said platen component to assume discrete locations thereon in response to the state of the electrical current within its field windings, said forcer component inducing a magnetic flux path through said platen component during operation of said motor, said method comprising the steps of:

providing a plurality of said platen components of a predetermined length;

machining the respective end portions of said platen components at an acute angle relative to said axis to form an angular splice surface having a plurality of partial teeth thereon;

positioning said platens in an end-to-end relation such that their longitudinal axes are coaxial and said partial teeth are juxtaposed;

aligning said partial teeth lying along said angular splice surfaces; and securing said platen components in said end-to-end relation such that said magnetic flux path is maintained across said splice allowing said forcer component to operate along the entire length of the spliced platens.

2. The method of claim 1 wherein the step of aligning further includes the step of inspecting said partial teeth using optical magnifying means.

3. The method of claim 2 wherein said step of inspecting is carried out by an optical comparator.

4. The method of claim 1 wherein said step of securing further includes the step of attaching said platens to a support base using fastening means.

5. The method of claim 1 wherein the step of machining further includes the steps of:

laying out said angle on said end portions of said platens to be spliced;

cutting said platens to form said angle within a specified angularity tolerance; and milling said angle to a specified flatness tolerance such that the resulting gap between said platens is minimized.

6. The method of claim 1 wherein said acute angle is within the range of 25 to 45 degrees.

* * * * *